United States Patent Office 3,526,615
Patented Sept. 1, 1970

3,526,615
PROCESS FOR THE COPOLYMERIZATION OF OLEFIN OXIDES WITH 1,3-DIOLEFINS
Wolfgang Oberkirch, Mariaweiler, Heinz Herlinger, Leverkusen, and Peter Gunther, Opladen, Germany, assignors to Farbenfabriken Bayer Aktiengesellschaft, Leverkusen, Germany, a corporation of Germany
No Drawing. Filed June 12, 1968, Ser. No. 736,281
Claims priority, application Germany, Sept. 8, 1967, F 53,450
Int. Cl. C08d 1/14, 3/02
U.S. Cl. 260—94.2                                 9 Claims

ABSTRACT OF THE DISCLOSURE

Copolymers from olefin oxides and 1,3-dienes are obtained by means or an organometallic mixed catalyst comprising:
(a) the addition compound of a salt of a transistion metal with a hexa-alkyl phosphoric acid triamide, and
(b) an alkyl compound of a metal of the second or third group of the Periodic Table.

This invention relates to a process for the copolymerization of olefin oxides with 1,3-diolefins by means of organometallic mixed catalysts.

According to Dutch patent specification No. 285,153, copolymers of propylene oxide and 1,3-butadiene can be obtained by heating the monomers for prolonged periods in the presence of a complex ferric chloride/propylene oxide catalyst.

It is also known that butadiene can be copolymerized with propylene oxide by using 1:2-addition compounds of nickel and cadmium halides with phosphines and zinc dialkyls as catalysts (Belgium patent specification No. 663,526).

Whereas in the first process, the dark brown catalyst is impossible to remove without substantial degradation of the polymer, the second process involves extremely long reaction times, ranging from 5 to 8 days, and gives maximum yields as low as 20%.

According to "Advances in polymer science and technology," S.C.I. Monograph No. 26, page 103, (London 1967), propylene oxide and 1,3-butadiene cannot be copolymerized with organometallic mixed catalysts.

The present invention provides a process for the production of copolymers from olefin oxides and 1,3-dienes, optionally in the presence of an inert organic solvent, wherein polymerization is carried out in the presence of an organometallic mixed catalyst of:

(a) the addition product of a salt of a transition metal with a hexa-alkyl phosphoric acid triamide, and
(b) an alkyl compound of a metal of the second or third group of the Periodic System.

Monomers

In principle, any olefin oxide may be subjected to the process, although $C_2$–$C_8$ alkylene oxides, $C_5$–$C_{12}$ cycloalkylene oxides, styrene oxides, aliphatic glycidyl ethers and optionally substituted aromatic glycidyl ethers are particularly suitable. Examples of these compounds include ethylene oxide, propylene oxide, butylene-1-oxide, styrene oxide, epichlorohydrin, butadiene monoxide, cyclohexene oxide, vinyl hexene oxide and the dioxide of 4,4′-dipropene-hydroxydiphenyl dimethylmethane. Aliphatic glycidyl ethers include in particular those which correspond to the formula

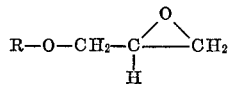

in which Ar represents phenyl or naphthyl, which may also be substituted for example by halogen (for example 1 to 5 chlorine atoms), alkyl groups with 1 to 4 carbon atoms, alkoxy groups with 1 to 4 carbon atoms or cyano groups. Examples of these compounds include phenyl glycidyl ethers and chlorophenyl glycidyl ethers.
in which R represents an alkyl group with from 1 to 4 carbon atoms or an alkenyl group with from 3 to 5 carbon atoms. Optionally substituted aromatic glycidyl ethers are compounds which correspond to the formula

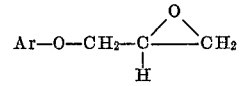

Although, in principle, any 1,3-diene is suitable, 1,3-butadiene, isoprene, piperylene, cyclo-1,3-hexadiene and 2,3-dimethyl-1,3-butadiene are particularly suitable.

The monomers may be used in a molar ratio of olefin oxide to 1,3-diene of from 1:100 to 100:1.

Catalysts

The catalysts may be obtained by reducing an addition compound of a salt of a transition metal and a hexaalkylphosphoric acid triamide, in solution or suspension in an inert organic solvent, with an alkyl compound of a metal of the second or third main group of the Periodic System. Reduction may also be carried out in the presence of the diene to be polymerised and/or of the olefin oxide.

Transition metals in the context of this invention preferably include the metals of the 4th to 8th secondary groups of the Periodic System whose d-electron shells are not fully occupied. Titanium, zirconium, cobalt, nickel, chromium, manganese, cadmium, vanadium and zinc are particularly suitable. The salts may be salts of inorganic or organic acids. Examples of suitable acid radicals include halides such a chloride, bromide, nitrate, sulphate, lower fatty acid radicals such as acetate, higher fatty acid radicals such as stearate, and aromatic acid radicals such as benzoate or naphthenate. Examples of some suitable acid salts include titanium (III) chloride, vanadium tetrachloride, manganese (II) chloride, cobalt acetate and, preferably, cobalt chloride, cobalt nitrate, nickel bromide and nickel nitrate.

The alkyl radicals in the hexa-alkyl phosphoric acid triamide may be linear, branched or cyclic and optionally unsaturated, and may be for example methyl, ethyl, propyl, propenyl, butyl, amyl, dodecyl, stearyl or cyclohexyl radicals. The amide groups of the hexa-alkyl phosphoric acid triamide may also be based on morpholine as the amine component. However, preferred alkyl radicals in the hexa-alkyl phosphoric acid triamide include n-alkyl and iso-alkyl radicals with 1 to 4 carbon atoms, such as methyl, ethyl, n-propyl, i-propyl, n-butyl and i-butyl radicals.

The adducts of the transition metal salt and hexaalkyl phosphoric acid triamide are preferably adducts in a molar ratio of 1:1 or 1:2. According to one of our own earlier proposals (application F 51,189 IVb/12 o), they may be obtained by reacting a transition metal, in the form of a salt thereof, with at least the stoichiometrically necessary quantity of a phosphoric acid amide of the formula

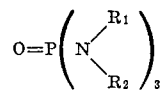

in which $R_1$ and $R_2$ represent similar or different lower alkyl radicals or together with the nitrogen atom may form part of a heterocyclic ring containing an oxygen atom as an additional hetero atom, in the presence of an organic solvent immiscible with water at a temperature in the range from about −20 to about 200° C., and preferably at a temperature of up to 150° C., azeotropically distilling off the water optionally present in the reaction mixture and the water liberated from the salt hydrate, together with the solvent and isolating the metal salt adduct which is formed.

Alkyl compounds of metals of the second or third group of the Periodic System preferably include compounds of the formula $R_xMe$, in which Me represents the metal, preferably zinc, aluminum and magnesium, $x$ stands for the valency of the metal and at the same time represents the number of radicals R. At least one of the radicals R is a lower alkyl radical, for example with 1 to 4 carbon atoms such as methyl, ethyl, propyl or butyl. The other radicals R may also be alkyl radicals, lower alkyl radicals in particular, although they may even be halogen atoms such as chlorine or bromine or alkoxy radicals, preferably lower alkoxy radicals such as methoxy or ethoxy. Particularly suitable compounds of this kind include diethyl zinc, dibutyl zinc, triethyl aluminum, ethoxy diethyl aluminum, diethyl aluminum chloride, magnesium diethyl and butyl magnesium bromide.

To prepare the catalyst, a solution or suspension of the transition metal salt/hexa-alkylphosphoric acid triamide adduct in an inert organic solvent, may be reduced with the pure or dissolved metal alkyl compound, if desired in the presence of the 1,3-diene. The metal salt adduct and the metal alkyl are used in a quantitative molar ratio of, for example, from 1:5 to 3:1. Suitable solvents, which may also be used for polymerization itself, include, for example, aliphatic and cycloaliphatic hydrocarbons such as pentane, hexane, heptane, cyclohexane and methylhexane; aromatic, optionally halogenated, hydrocarbons such as benzene, toluene, xylene or chlorobenzene; or ethers such as diethyl ether. The catalysts are preferably prepared by combining the solutions or suspensions or the solids at room temperature in the absence both of oxygen and of atmospheric moisture.

Polymerization

For polymerization, the olefin oxide and the diene may be added to the already prepared catalyst in the absence of moisture and oxygen. For this purpose, it is possible to operate for example in an inert gas atmosphere (e.g. nitrogen or argon). It is also possible, however, to prepare the catalyst in the presence of the monomers themseves. Polymerization may be carried out in the presence of one of the above-mentioned solvents, preferably in a dried solvent, or even in the olefin oxides as solvent. The polymerization is carried out at normal pressure or even at excess pressure at a temperature of from −40 to 120° C. As a rule, a polymerization time of from 1 to 50 hours is required. The catalysts are generally used in quantities of from 0.1 to 3% by weight and preferably in quantities of from 0.5 to 2% by weight, based on monomer.

Accordingly, the process according to the invention has the advantage that polymerization is completed much more quickly than in conventional processes. The crude polymer may be worked up and the catalyst deactivated, for example by dissolving the contents of the polymerization vessel in a suitable solvent such as chloroform, toluene or benzene and successively washing the resulting solution with 3% by weight aqueous sulphuric acid, water, sodium bicarbonate solution and optionally with a solution of a complex-former such as an alkylene diamine tetra-acetic acid. After the organic solution has been dried, the solvent is evaporated, leaving the polymer behind in pure form.

The polymers show outstanding properties. According to elementary analysis, the copolymer has a diene content of from 5 to 30% by weight. It is possible by infrared spectroscopy to show that in the case of 1,3-butadiene, for example, from 30 to 50% of the diene units are incorporated by 1,2-polymerization and the remainder by 1,4-polymerization. The copolymers are either rubberlike or solid. The rubber-like products can be converted into elastomeric products by known methods and worked in.

Some of the resulting compounds are new, in particular the copolymers of aliphatic and aromatic glycidyl ethers and dienes. Both the term glycidyl ether and the term diene come under the above definition. These substances contain some 75 to 98 mol percent of glycidyl ether, the rest being copolymerised diene. The diene radicals are irregularly distributed in the polymers.

Other new compounds include the copolymers of propylene oxide and dienes with 5 or 6 carbon atoms. They are similar in composition to the glycidyl ether copolymers.

EXAMPLE 1

5.3 g. of cobalt nitrate/hexamethyl phosphoric acid triamide-1:2 adduct are dissolved in 50 ml. of dried toluene in the presence of argon. 58 g. of propylene oxide are added to the resulting solution, which is then saturated at room temperature with dry, air-free butadiene. A solution of 8.7 ml. of dibutyl zinc in 30 ml. of toluene is added to the reaction mixture at −40° C., and the product is allowed to return to room temperature again with stirring. The mixture is transferred to an autoclave and 100 g. of butadiene are added to it. After 12 hours at 65° C., the solids contents of the autoclave are dissolved in chloroform and the resulting solution is washed first with dilute 30% by weight sulphuric acid and then successively with water, sodium bicarbonate solution, Trilon-B-solution and water. The chloroform layer is separated off, dried, filtered and concentrated in vacuo. Yield: 45 g.

EXAMPLE 2

5.7 g. of nickel nitrate/hexamethyl phosphoric acid triamide-1:2 adduct are dissolved in 50 ml. of dry toluene in the presence of argon, and 58 g. of propylene oxide are added to the resulting solution which is then saturated with butadiene and cooled to −40° C. A solution of 13 ml. of triisobutyl aluminium in 30 ml. of toluene is then added. After heating to room temperature, 113 g. of butadiene are added to the resulting product in an autoclave. After 24 hours at 65° C., 32 g. of a semi-solid copolymer are obtained after working up as in Example 1.

EXAMPLE 3

5.4 g. of nickel nitrate/hexamethyl phosphoric acid triamide-1:2-adduct are dissolved in 60 ml. of dry toluene in the presence of argon, and 58 g. of propylene oxide are added to the resulting solution which is then saturated with butadiene and cooled to −40° C. 8.9 ml. of dibutyl zinc are then added. 120 g. of butadiene are added in an autoclave and the reaction mixture is stirred for 40 hours at 60° C. 55 g. of pure copolymer are obtained after working up as described in Example 1.

EXAMPLE 4

5.8 g. of nickel bromide/hexamethyl phosphoric acid triamide-1:2-adduct are dissolved in 100 ml. of dry propylene oxide in the presence of argon and the resulting solution is saturated with butadiene. 8.9 ml. of dibutyl zinc are then added. 50 g. of butadiene are added in an autoclave, and the contents of the autoclave heated to 65° C. After 45 hours, the product is worked up as described in Example 1. Yield: 54 g.

EXAMPLE 5

5.4 g. of nickel nitrate/hexamethyl phosphoric acid triamide-1:2 adduct are dissolved in 100 ml. of isoprene. 8.9 ml. of dibutyl zinc in 30 ml. of toluene are then added at 50° C. The reaction mixture is allowed to come slowly to room temperature, after which 58 g. of propylene oxide are added to it. After 30 hours at 50° C., the mixture can no longer be stirred. 50 g. of a highly viscous, rubber-like copolymer are obtained after working up as described in Example 1.

EXAMPLE 6

5.1 g. of cobalt nitrate/hexamethyl phosphoric acid triamide-1:2-adduct are dissolved in 50 ml. of dry toluene and 70 ml. of butene-1-oxide in the presence of argon, and the resulting solution is saturated with butadiene. 8.5 ml. of dibutyl zinc are then added to it at −40° C. followed by heating to room temperature. 100 g. of butadiene are added in an autoclave. After 4 hours at 65° C., the reaction mixture can no longer be stirred. After another 4 hours, 60 g. of rubber-like copolymer are obtained after working up as in Example 1.

EXAMPLE 7

5.1 g. of nickel nitrate/hexamethyl phosphoric acid triamide-1:2-adduct are dissolved in 25 ml. of toluene and 100 ml. of isoprene. 8.9 ml. of dibutyl zinc in 25 ml. of toluene are then added at − 50° C. in the presence of argon. After heating to around 20° C., 75 g. of butene-1-oxide are added and the reaction mixture is stirred for 30 hours at 50° C. 40 g. of an elastomeric copolymer are obtained after working up as described in Example 1.

EXAMPLE 8

5.2 g. of cobalt chloride/hexamethyl phosphoric acid triamide-1:2-adduct are dissolved in 175 ml. of toluene and 83 g. of phenyl glycidyl ether in the presence of argon, and the resulting solution is saturated with butadiene. 11.3 ml. of triisobutyl aluminum are then added to it. 120 g. of butadiene are added in an autoclave, the contents of which are then heated to 65° C. After 4 hours, the temperature is increased to 100° C. and the reaction mixture is worked up after an interval of 15 hours. The mixture has 3 times its volume of methanol added to it, resulting in the precipitation of a fine white powder. In order to move catalyst residues, the powder is washed repeatedly with 3% by weight hydrochloric acid, 10% Trilon-B-solution and with water. Yield: 93 g. of a greyish-white, powdery copolymer melting above 280° C.

We claim:

1. A process for producing a copolymer from an olefin oxide and a 1,3-diene which comprises copolymerizing an olefin oxide and a 1,3-diene in a molar ratio of from 1:100 to 100:1 in the presence of from 0.1 to 3% by weight a catalyst comprising
   (a) the addition compound of a salt of a transition metal with a hexa-alkyl phosphoric acid triamide and
   (b) an alkyl compound of a metal of the second or third group of the Periodic Table, the molar ratio of (a):(b) being from 1:5 to 3:1.

2. The process of claim 1 wherein said olefin oxide is an alkylene oxide having 2 to 8 carbon atoms.

3. The process of claim 1 wherein said 1,3-diene is 1,3 - butadiene, isoprene, piperylene, cyclo-1,3-hexadiene or 2,3-dimethyl-1,3-butadiene.

4. The process of claim 1 wherein said salt of a transition metal is an inorganic salt of titanium, zirconium, cobalt, nickel, chromium, manganese, cadmium, vanadium or zinc.

5. The process of claim 1 wherein said alkyl compound (b) is a compound of the formula $R_xMe$ wherein Me represents zinc, aluminum or magnesium, R is a lower alkyl radical and $x$ is a number corresponding to the valence of Me.

6. The process of claim 9 wherein said copolymerizing is effected in an inert organic solvent.

7. The process of claim 9 wherein said transition metal is a Group VIII metal.

8. A copolymer formed as the addition polymerization product of (1) a glycidyl ether of the formula

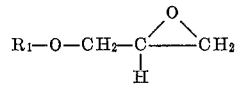

wherein $R_1$ is alkyl containing 1 to 4 carbon atoms, alkenyl containing 3 to 5 carbon atoms, phenyl, naphthyl or phenyl or naphthyl substituted by halogen, alkyl having 1 to 4 carbon atoms, alkoxy having 1 to 4 carbon atoms or cyano and (2) butadiene, isoprene, piperylene, cyclo-1,3-hexadiene or 2,3-dimethyl-1,3-butadiene, said copolymer containing from 75 to 98 mol percent of glycidyl ether and the radical of (2) being irregularly distributed throughout said copolymer.

9. A copolymer formed by the addition copolymerization of propylene oxide and a diene selected from the group consisting of isoprene, piperylene, cyclo-1,3-hexadiene and 2,3-dimethyl-1,3-butadiene, said copolymer containing a diene content of from 5 to 30% by weight.

References Cited

UNITED STATES PATENTS

| | | | |
|---|---|---|---|
| 3,077,467 | 2/1963 | Gurgiolo | 260—94.2 |
| 3,240,747 | 3/1966 | Heitmiller et al. | 260—45.7 |
| 3,362,918 | 1/1968 | Childers | 260—2 |
| 3,417,069 | 12/1968 | Davis et al. | 260—92.3 |
| 3,450,647 | 1/1969 | Gunther et al. | 260—2 |

JOSEPH L. SCHOFER, Primary Examiner

R. A. GAITHER, Assistant Examiner

U.S. Cl. X.R.

260—94.3, 821